April 16, 1929.  H. A. BALLARD  1,709,336
CUTTING MACHINE
Filed Feb. 8, 1926
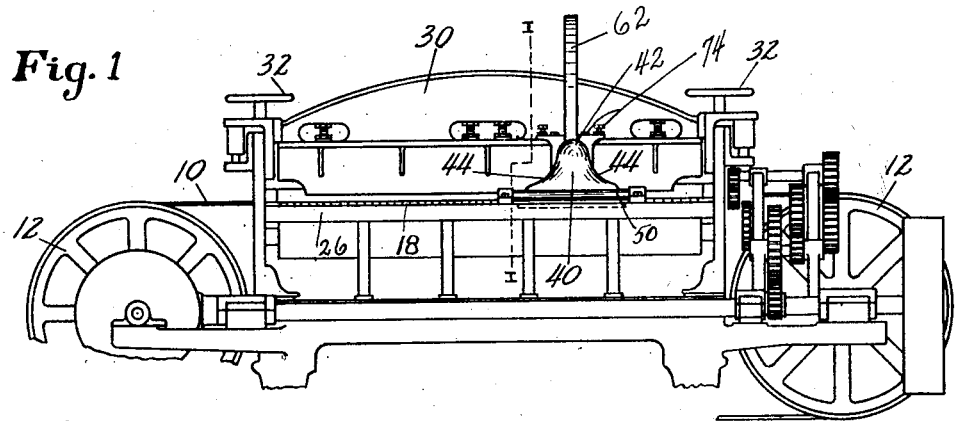
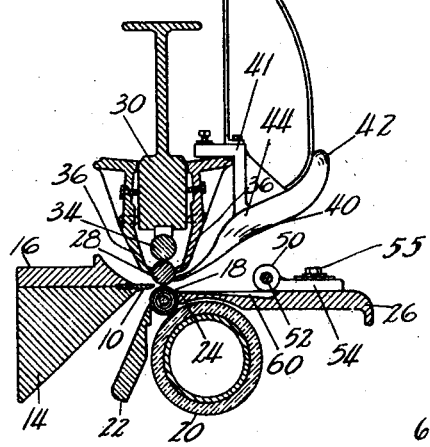
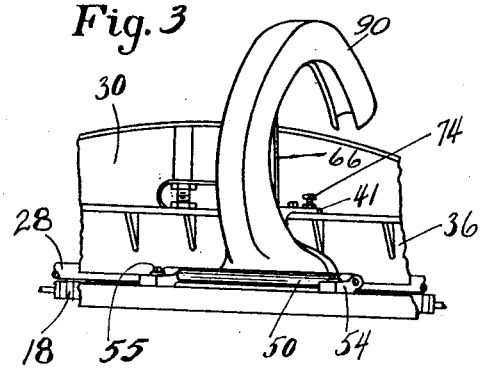
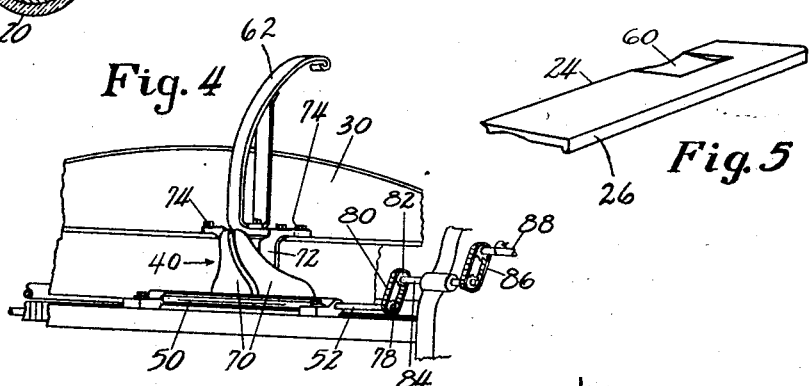
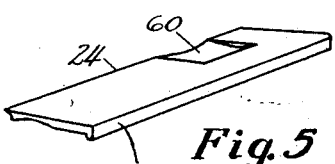
INVENTOR
Harrie A Ballard.

Patented Apr. 16, 1929.

1,709,336

UNITED STATES PATENT OFFICE.

HARRIE A. BALLARD, OF BEVERLY, MASSACHUSETTS, ASSIGNOR TO THE TURNER TANNING MACHINERY COMPANY, OF PORTLAND, MAINE, A CORPORATION OF MAINE.

CUTTING MACHINE.

Application filed February 8, 1926. Serial No. 86,798.

This invention relates to cutting machines and is illustrated as embodied in a splitting machine having means for flattening a tire and guiding it toward the cutting mechanism.

It attempts to utilize the rubber and other material contained in vast quantities of worn-out automobile tires, it is common practice to slice off from the worn tire the remaining portion of the rubber tread. Since this tread portion contains no fabric, it is treated separately to reclaim the rubber. In order to separate the rubber from the rubberized fabric of the tire it is desirable to split the remainder of the tire, after removing the tread, into layers so as to expose the fabric portion of the layers to treatment designed to destroy the fabric or otherwise separate it from the rubber. In the operations of removing the tread portion from a tire and in splitting the remainder of the tire into layers it has been found advantageous to employ a splitting machine of the well-known band knife type. Preliminarily to the splitting operations a tire is severed by a transverse cut through the whole body of the tire so that the severed ends may be separated and the tire thus introduced to the splitting machine by forcing one of the ends between the gage roll and the ring roll of the machine. Due largely to the presence of the tread, the tire is very resistant to all efforts to spread it out flat, so much so that heretofore the combined efforts of two or three men have been required to force even a moderate-sized tire into feeding engagement with the feed rolls of a splitting machine. It will be readily understood that the work involved in splitting operations on the tires, and particularly in removing the tread portion thereof, has been difficult, laborious in the extreme, and not unattended with danger to the workmen.

Accordingly, it is an object of this invention to provide such improvements in splitting machines as will facilitate introduction of work of the character referred to, and make it possible for a single operator to accomplish without danger or difficulty even greater production than that heretofore achieved only by the united efforts of two or three workmen.

To this end and in accordance with an important feature of the invention there is provided means for flattening a rubber tire or similar article so that it is readily engaged by the feeding means of the machine and fed to the operating tool. Preferably and as shown, the flattening means comprises a member having diverging surfaces adapted to spread the tire as the latter is moved along the said surfaces. For co-operation with the spreading member there is provided, as illustrated, a member which serves to guide the entering end of the tire and to hold the tire against the spreading member and to facilitate movement thereof by lessening friction between the tire and the tire flattening means. In the illustrated construction, this second member is shown as a rotatable cylindrical member that may be power driven, in which case it operates further as an auxiliary tire feeding means.

In order that work of various thicknesses may be economically and efficiently operated upon to cut off "splits" or layers of various thicknesses, a gage has commonly been provided in splitting machines by adjustment of which the thickness of the splits or cut-off layers may be determined. An important feature of this invention resides in the provision of connecting means between the gage and work flattening means whereby adjustment of the former is accompanied by adjustment of the latter to accommodate tires or other work pieces of different sizes. In the illustrated machine, the gage support is adjustable to secure adjustment of the gage and advantage is taken of this fact to mount the tire spreading element of the tire flattening means upon the gage support to move therewith. In this way the tire flattening means maintains a constant relation to the gage whatever the adjustment of the latter.

To assist the operator in supporting a tire preliminarily to its movement toward work operating position and in guiding the tire to the spreading member there is provided a work supporting and guiding member in the form of a curved horn adapted to enter the cavity of the tubular tire and either formed as an attachment to the spreading member or made integrally therewith.

While the invention is illustrated as embodied in a splitting machine of a standard belt-knife type, it will be understood that the invention and various important features thereof may be applied to cutting machines of other types and to machines designed to perform other operations on tires and on similar tubular pieces of work.

Other features of importance and novel combinations of parts will be described in the detailed specification and pointed out in the appended claims.

In the drawings,

Figure 1 is a view in front elevation of a splitting machine showing one embodiment of the invention;

Fig. 2 is a transverse, sectional view taken along the line I—I of Fig. 1;

Fig. 3 is a detail view showing an automobile tire in process of being operated upon;

Fig. 4 is a detail view illustrating a modification; and

Fig. 5 is a detail view of the recess in the ring plate.

In the illustrated splitting machine which is of the band knife type there is provided an endless band knife 10 arranged to be supported and driven by two wheels 12, the upper straight run of the knife 10 being supported by jaw plates 14 and 16 respectively arranged to maintain the knife in a horizontal plane and to support it against the thrust of the work while at the same time permitting it to move while the work is being fed against its cutting edge. As shown, the work feeding means comprises a ring-roll 18 of well-known construction which may be power driven, if desired, although it is ordinarily driven by frictional contact with a rubber covered bed roll such as that shown at 20. It will be understood that the individual rings of the ring-roll 18 may be depressed by the thicker portions of the work and that normally the rings are supported at a predetermined upper limit where they are guided and retained in place by means of two ring-plates 22 and 24 which present concaved edge surfaces to contact with the rings of the ring-roll. As shown, the ring-plate 24 is part of a work supporting table 26. For co-operation with the ring-roll 18 in feeding the work there is provided a roll 28 mounted in bearings provided by beam 30, means (not shown) being provided for positively driving the roll 28. This feed roll 28 is also a gage roll since by reason of its spacing with respect to the plane of the cutting edge of the knife 10 the thickness of the top split may be accurately determined. If, for instance, the gage roll 28 be elevated through an upward adjustment of the beam 30 through proper manipulation of hand wheels 32 the thickness of the upper split will be proportionately increased. For backing the gage roll 28 to prevent bending of the latter at points intermediate between its ends there are provided a number of rotary backing rolls, one of which is shown at 34 in Fig. 2. To prevent lateral movement of the gage roll 28 the beam 30 is provided, as shown, with a pair of guide plates 36 adjustable to present their lower edges in contact with the roll 28 as guides therefor. Upon inspection of the drawings and particularly of Fig. 2 it will be readily understood that work moved over the table 26 in a direction toward the knife 10 is engaged by the feeding means comprising the ring-roll 18 and the gage roll 28 and accurately fed to the knife 10, one split passing upwardly over the jaw plate 16 while the other split, in this case the rubber tread of the tire 90, passes downwardly below the jaw plate 14 and over the ring-plate 22. For a more complete disclosure of the driving elements and other parts of a well-known commercial splitting machine such as that illustrated in the drawings, reference may be had to Patent No. 626,858, granted June 13, 1899, upon application of Amory A. Chilson.

As has been stated in the foregoing discussion very considerable difficulty has heretofore been experienced in the operation of introducing automobile tires into the grip of the feeding means in splitting machines. For the purpose of facilitating the feeding of a tire to the cutting means and also of obviating the very serious likelihood of injury to the operator, there is provided in the illustrated construction means for flattening the tire so that it will readily engage between the ring-roll 18 and the gage roll 28 operating as feed rolls. As shown, this flattening means comprises a spreader member 40 secured by a bracket 41 to the beam 30 and constructed to present a rounded projecting portion 42 over which the tire may be readily forced and provided with diverging surfaces 44 which operate to spread out the side portions of the tubular tire as the latter is moved downwardly and in a direction to engage with the feeding rolls 18 and 28. At its lower or inner end the spreader member 40 presents a broad flat surface, the extreme edge of which is in close juxtaposition to the ring-roll 28 (Fig. 2). For guiding the tire so that portions of the latter will engage with the flared portions of the spreader member 40 and for holding the tire against the spreader member there is provided a member 50 which is a rotatable cylindrical member designed to serve as an anti-friction member facilitating the introduction of the work and its movement through the flattening means. This cylindrical member 50 is supported rotatably upon a shaft 52 carried by bearings provided by brackets 54 secured adjustably to the work supporting table 26. Adjustment of the brackets 54 is secured by bolts 55 working in slots (not shown) in the brackets and is for the purpose of positioning the cylindrical member 50 in the desired relation to the adjacent surface of the spreader member 40, it being clear that more space between the spreader member and the member 50 must be provided for the larger and heavier tires than for those of smaller dimensions. While, as stated, adjustment of the cylindrical member 50 may be necessary in order to secure proper operation of the machine with tires differing markedly in size, there is another adjustment of the tire flattening means which is secured by reason of the fact that the spreader member 40 is mounted upon the beam 30 which carries the gage roll 28. Hence, when the beam 30 is adjusted to move the upper feed roll 28, which is the gage roll, in directions toward or away from the plane of the cutter 10, the spreader member 40 is also moved and to the same extent. Thus, the spreader member always keeps a predetermined relation with respect to the gage roll 28. If the latter be adjusted upwardly to insure the proper separation of a rubber tread from a thicker heavier tire, the spreader member is also adjusted and this may be all of the adjustment required in operating upon the heavier tire. Again, when thinner or lighter tires are to be operated upon, adjustment of the gage roll 28 downwardly to insure removal of the rubber tread portion only of the tire will be accompanied by a corresponding adjustment of the spreader member 40. In many instances this adjustment of the spreader 40 will constitute the only adjustment of the tire flattening means when adapting the machine by adjustment to operate upon various sizes of tires. In connection with the gaging operation, it should be noted that the fabric layers of the tire pass above the cutter 10 and that it is these layers which are engaged by the gage 28, since they are apt to be substantially uniform in thickness in all tires of a given make and grade. Since the rubber tread is subjected to the greatest wear it is apt to be very irregular in thickness and not suitable for gaging. Hence it is cut off and directed downwardly below the cutter 10.

Another feature of importance is that which relates to the provision in the ring-plate 24 and in the table 26 of a recessed portion 60 located below and in back of the cylindrical member 50 and extending as a slanting surface up to the ring-roll 18. The purpose of this recessed portion in the table 26 is to accommodate the end portion of the tire as the latter is introduced between the spreader member 40 and the cylindrical member 50 and to guide this forward end in conjunction with the lower spreading surface of the spreader member 40 so that the progressively flattened end of the tire will be guided properly into contact with the feed rolls 18 and 28. Furthermore, this recessed portion 60 accommodates the buckled portion of the tire above the end portion as the tire is forced downwardly in engagement with the progressively diverging surfaces of the spreader member 40. Upon reference to Fig. 5 of the drawings it will be observed that the recess 60 has its deeper portion in the table 26 adjacent to the roll 50 where the entering end of the tire will contact with the plate 26 and that the floor of the recess slants upwardly toward the rear edge of the ring-plate 24, thus furnishing a guiding surface which serves to direct the forward end of the tire into contact with the ring-roll 18. Furthermore, the recess along the edge of the ring-plate 24 where the latter contacts with the ring-roll 18 is curved slightly so as to accommodate the end of the tire while the latter is still slightly curved thus requiring of the operator less effort than would be the case if the recess were perfectly flat. Moreover, this cutting away of the edge of the ring plate 24 makes it certain that the ring rolls will always be in position to engage the tire in spite of the fact that they are likely to be considerably depressed by heavy work into the yielding surface of the bed roll 20. It will be understood that ordinarily the ring-plate 24 will be provided with a plurality of recesses similar to the recess 60 and spaced from each other lengthwise of the ring-plate 24 so that more than one tire flattening means may be attached to the beam 30 and to the table 26 and have a recess 60 for co-operation therewith, thus providing tire splitting stations for two or more operators along the length of the same splitting machine. Another reason for providing a plurality of recesses like the recess 60 is that it is desirable to shift the tire flattening means to a new location after a time, since the ring-roll 18 after long continued use becomes less effective, principally because of the wearing away of the rubber covered bed roll 20 which serves to support the ring-roll and to drive the latter.

Means is also provided in the illustrated machine for supporting the tire in a substantially vertical plane prior to and while it is being threaded upon the upper end 42 of the spreader member 40. As shown, this supporting and guiding means of the tire comprises a curved horn 62 having its lower end attached to the upper end of the spreader member 40 and its free end formed with a curved or folded portion 64 adapted to enter the concaved recess of the tubular tire and to offer no obstruction to sliding movement of the tire relatively to the horn 62. Since the horn 62 is of light construction, supporting means is provided therefor comprising a strut 66 secured to the horn and to the bracket 41 of the spreader member 40.

In the modification shown in Fig. 4 of the drawings the spreader member is disclosed as made up of two parts 70, each of which is secured by means of a bracket 72 to the beam 30, the said brackets being secured by means of bolts and set screws indicated at 74 arranged so as to provide for adjustment of the spreader parts 70 toward and from each other, the purpose being to provide a spreader member of a size to accommodate the smallest tire which it is desired to operate upon and also the largest sizes of tires. In operating upon small tires it is clear that the upwardly projecting portion 42 of the spreader member 40, and of spreader member 70—70, should be small enough to enter readily within the recess of the tubular tire and that the diverging surfaces 44 are most effective when the angle of divergence is a moderate one. Hence, while it would be possible to provide a spreader member 40 with a projecting entering portion 42 suited to all sizes of tires, it may be preferable to provide for certain working conditions the divided spreader member adjustable to accommodate tires of different sizes.

In the embodiment shown in this same Figure 4, means is provided for rotating the cylindrical member 50 so that in addition to serving as a guiding means and as a flattening means in co-operation with the spreader 40 it serves also as an auxiliary feeding means by which the tire is fed in a direction toward the feed rolls 18 and 28 adjacent to the cutter 10. While any desired arrangements may be provided for driving the shaft 52 and the cylindrical member 50, which in this case is secured to shaft 52, that shown comprises a sprocket wheel 78 secured on the end of the shaft 52 and sprocket chain 80 passing around a second sprocket wheel 82 fixedly attached to a stub shaft 84 mounted in a fixed portion of the frame of the machine and driven in turn by sprocket wheels and sprocket chain 86 arranged to be driven from a counter shaft 88 of the machine.

In operating with the machine illustrated in the drawings, a tire 90 is first positioned by the aid of the horn 62, the horn being slender enough so that it may be easily introduced through the slot into the recess within the tubular tire. It will be readily understood that the horn 62 is of very considerable aid to the operator in supporting and positioning a heavy tire in a substantially vertical plane as a preliminary to movement of this tire in a direction to force a severed end thereof upon the rounded projecting portion 42 of the spreader member 40. As the tire is forced downwardly in contact with the spreader member it shortly contacts also with the cylindrical member 50 which serves to guide the end of the tire and to hold it against the spreader member. In case the cylindrical member 50 is power driven, as shown in Fig. 4, this member aids also in feeding the tire in the direction to cause the end of the tire to engage with the feed rolls 18 and 28. When the flattened end of the tire has been engaged by the feed rolls 18 and 28, the tire is quickly fed through the machine and the rubber tread is cut off. After cutting off the treads of a stack of tires, the gage 28 may be set and a fabric layer severed from the tires, according to the judgment of the operator. It is common practice to refer to the rubber tread and to the rubberized fabric layer cut off from the body of the tire as a "split." In any case the thickness of the split may be determined by adjustment of the gage 28.

Having described my invention, what I claim as new and desire to secure by Letters Patent is:—

1. In a machine for cutting a slice from a surface of a tubular piece of work, cutting means, and means comprising a member having diverging surfaces for opening a tubular piece of work and spreading it out in a substantially flat condition preliminarily to a cutting operation.

2. In a machine for cutting a slice from a surface of a tubular piece of work, a cutting tool, and means having diverging surfaces for opening and spreading a tire out flat prior to an operation by the tool.

3. In a machine for cutting a slice from a surface of a tubular piece of work, cutting means movable transversely of a tire to cut off the tread portion, a device having diverging surfaces to open a tubular tire and spread it out in a substantially flat condition for the operation of the cutting means, and means arranged to guide the tire and hold it in operative relation to the device.

4. In a machine for cutting a slice from a surface of a tubular piece of work, cutting means movable transversely of a tire to cut off the tread portion, a device having diverging surfaces to open a tubular tire and spread it out in a substantially flat condition for the operation of the cutting means, and a member arranged to guide the tire into operative relation to the device and to co-operate therewith in the opening and spreading operations.

5. In a cutting machine, cutting means, means for supporting a tire in a vertical plane, a device for opening the tire and spreading it out before it reaches the cutting means, and a rotary anti-friction member for co-operation with the device in the tire opening and spreading operations.

6. In a machine for cutting a slice from a surface of a tubular piece of work, cutting means movable transversely of a tire to cut off the tread portion, means for feeding a tubular tire in flattened condition for the operation of the cutting means, and means for flattening the tire to facilitate its engagement with the feeding means.

7. In a cutting machine, cutting means operating in a horizontal plane, means for supporting a tire in a substantial vertical plane, and means for flattening the tire preliminarily to feeding it to the cutting means.

8. In a cutting machine, cutting means operating in a horizontal plane, means comprising a device having diverging surfaces for flattening a tire, and a member for supporting the tire in a vertical plane and for guiding it to the flattening means.

9. In a cutting machine, cutting means, means for feeding a tire to the cutting means, means for flattening the tire to facilitate its engagement by the feeding means, and means for feeding the tire to the tire-flattening means.

10. In a cutting machine, cutting means, means for feeding a tire to the cutting means, means for flattening the tire to facilitate its engagement by the feeding means, said last-mentioned means comprising a member having diverging surfaces to spread open the tire and a rotary member for holding the tire against said spreading member, and means for driving the rotary member to assist in feeding the tire along the tire spreading member.

11. In a machine for slicing tread portions from tires, cutting means comprising a cutter movable transversely of a tire to cut off the tread portion, feed rolls for engaging opposite sides of a flattened tire to feed it to the moving cutter, and a member having diverging surfaces for opening and flattening the tire throughout its width before it is engaged by the feed rolls.

12. In a machine for slicing tread portions from tires, cutting means comprising a cutter movable transversely of a tire cut off the tread portion, feed rolls for engaging opposite sides of a flattened tire to feed it to the moving cutter, and means for flattening the tire to facilitate its engagement by the feed rolls, said last-mentioned means comprising a member having diverging surfaces to open and spread out the tire, and a member for co-operation with the first-mentioned member to cause spreading of the tire and of the tread portion in a substantially flat condition.

13. In a machine for operating on tires, cutting means comprising a movable cutter, feed rolls for engaging opposite sides of a flattened tire to feed it to the moving cutter, a member having diverging surfaces for opening and spreading out the tire before it is engaged by the feed rolls, and a member adapted to enter the tubular tire to support it in a vertical plane while it is being fed along the spreading-out member.

14. In a machine for slicing tread portions from tires, cutting means comprising a cutter having a cutting edge movable in a direction transverse to the tread of a tire, feed rolls for engaging opposite sides of a flattened tire to feed it to the moving cutter, a member having diverging surfaces for opening and spreading out the tire throughout its width before it is engaged by the feed rolls, said member being constructed of two relatively movable parts so that the diverging surfaces may be adjusted relatively to each other to accommodate tires differing considerably in size.

15. In a machine for operating on tires, cutting means, feed rolls for engaging opposite sides of a flattened tire to feed it to the cutting means, a table over which the tire is passed to the feed rolls, said table having a recessed portion, and means located over the recessed portion of the table for flattening the tire prior to its engagement by the feed rolls.

16. In a machine for operating on tires, cutting means comprising a movable cutter, feed rolls for engaging with opposite sides of a flattened tire to feed it to the moving cutter, a table over which the tire is passed to the feed rolls, said table having a recessed portion, a member having diverging surfaces for opening and spreading out the tire, said member being located over the recessed portion of the table, and a member for holding the tire against the tire-spreading member.

17. In a cutting machine, cutting means comprising a movable cutter, feed rolls for engaging opposite sides of a flattened tubular piece of work to feed it to the moving cutter, one of said feed rolls being adjustable to serve as a gage for work of different thicknesses, and a member having diverging surfaces for opening and spreading out the tubular work before it is engaged by the feed rolls, said member being mounted to be adjustable with the adjustable feed roll.

18. In a machine for operating on tires, cutting means, feed rolls for engaging opposite sides of a flattened tire to feed it to the cutting means, one of said feed rolls being adjustable to serve as a gage for cutting off different thicknesses of layers, and means for flattening the tire to facilitate its engagement by the feed rolls, said last-mentioned means being adjustable with the adjustable feed roll.

19. In a machine for operating on tires, cutting means comprising a movable cutter, means for engaging opposite sides of a flattened tire to feed it to the moving cutter, a gage, means for adjusting the gage to determine the thickness of a layer split from the tire, means for flattening the tire before it is engaged by the feeding means, and connections between the tire-flattening means and the adjusting means so that the former is adjusted simultaneously with the gage.

20. In a machine for operating on tires, cutting means, means for feeding a tire to the cutting means, a gage for determining the thickness of a split from the tire, a support for the gage adjustable to adjust the gage to vary the thickness of the split, means for flattening a tire to facilitate its engagement by the feed rolls, and connections between the flattening means and said support whereby the flattening means is adjusted for different sized tires simultaneously with the adjustable gage.

21. In a machine for operating on tires, cutting means, means for feeding a tire to the cutting means, means for adjusting the feeding means to accommodate different-sized tires, means for flattening the tire prior to its engagement by the feeding means, and connections between the adjusting means and the flattening means by which the latter is adjusted simultaneously with the adjustment of the feeding means.

22. In a machine having a cutting means for slicing tread portions from tires, a device having diverging surfaces to open a tire and spread it out throughout its width, and a rotary member arranged to guide the tire into operative relation to the device and to co-operate therewith in the opening and spreading operations.

23. An attachment for a machine having a cutter for slicing tread portions from tires, comprising a horn for supporting a tire in a vertical plane, a device for opening a tire and spreading it out before it reaches the field of operation of the cutter, and a rotary member for co-operation with the device in the tire opening and spreading operations.

24. In a machine for operating on tires, cutting means, feed rolls for engaging a tire to feed it to the cutting means, and a table over which the tire is passed to the feed rolls, said table having a recessed portion adapted to facilitate the introduction of the tire into the grip of the feed rolls.

In testimony whereof I have signed my name to this specification.

HARRIE A. BALLARD.